United States Patent Office 3,082,241
Patented Mar. 19, 1963

3,082,241
TETRA- AND PENTACHLORINATED
CYANOESTERS
Peter L. de Benneville, Philadelphia, and Heinz W. Blessing, Levittown, Pa., assignors to Rohm & Haas Company, Philadelphia, Pa., a corporation of Delaware
No Drawing. Filed Aug. 18, 1959, Ser. No. 834,413
7 Claims. (Cl. 260—465.4)

This invention deals with specific tetra- and pentachlorinated esters as new compositions of matter. It further deals with a method for the preparation of these specific tetra- and pentachlorinated cyanoesters.

The compounds of this invention may be represented by the formula $$CNCCl_2CH_2COOCH_xCl_y$$

in which $x$ is one or zero, $y$ is two or three, and $x$ and $y$ equal three. The products are named dichloromethyl 3-cyano-3,3-dichloropropionate and trichloromethyl 3-cyano-3,3-dichloropropionate.

The products of this invention are prepared by chlorinating methyl or chloromethyl 3-cyano-3,3-dichloropropionate until the weight gain corresponds to the introduction of two to three chlorine atoms, depending on the starting material used and the product desired. Chlorination is conducted preferably in the presence of a volatile, non-polar organic solvent. It is necessary that the solvent be one that will not itself chlorinate, such as carbon tetrachloride, ethylene hexachloride, chlorinated hydrocarbons, and perfluorochlorinated hydrocarbons.

The methyl and chloromethyl 3-cyano-3,3-dichloropropionate reactants are prepared according to the methods disclosed in Serial Nos. 834,408 and 834,412, filed August 18, 1959.

In the present method, it is possible to employ chlorine in either the gaseous or liquid state, the gaseous state being somewhat preferred.

The process proceeds in the presence of actinic light, and in the absence of added catalysts, although there may be employed a free radical type catalyst, such as an azo compound or a peroxide. Suitable in this respect are $\alpha,\alpha'$-azodiisobutyronitrile and other azo nitriles, benzoyl peroxide, phthaloyl peroxide, naphthoyl peroxide, substituted benzoyl peroxides, acetyl peroxide, caproyl peroxide, lauroyl peroxide, cinnamoyl peroxide, acetylbenzoyl peroxide, tert-butyl hydroperoxide, di-tert-butyl peroxide, hydroxycyclohexyl hydroperoxide, cumene hydroperoxide, urea peroxide, oleoyl peroxide and triacetone peroxide. There may also be employed mixtures of the above catalysts. Generally, amounts in the range of about 0.1 to 5.0% or more may be employed as desired.

The reaction is conducted at a temperature of about 20° to 100° C., preferably at 50° to 95° C. It is frequently advantageous to conduct the reaction at the reflux temperature of the reaction mixture.

At the end of the reaction, which is indicated by the appropriate absorption of chlorine, the solvent is removed and the product is recovered by distillation.

The products of this invention are particularly useful as herbicides, especially against dicotyledonous plants. These compounds are most effective when employed in post-emergence applications according to standard procedures. The compounds of this invention are also useful as herbicides against monocotyledonous plants, particularly in post-emergence applications. Maximum results are observed when concentrations of about 7 to 10 pounds per acre are made as a spray, wettable powders, or dust in noninert carriers. The compounds of this invention, particularly when applied at a rate of 10 pounds per acre, give excellent control of mustard, wild carrot, sorrel, pigweed, lambs quarter, and millet and give effective control of crabgrass and foxtail.

The present invention may be more fully understood by the following illustrative examples. Parts by weight are used throughout.

Example 1

Chlorine gas is passed into a solution of methyl 3-cyano-3,3-dichloropropionate (54.6 parts) and $\alpha,\alpha'$-azodiisobutyronitrile (0.5 part) in carbon tetrachloride (180 parts) and held at reflux temperature. The reactants are illuminated by actinic light from a 300 watt spotlight placed at a distance of about 8 inches from the reaction vessel. After 3 and 6 hours from the start of chlorine introduction, more $\alpha,\alpha'$-azodiisobutyronitrile (0.5 part) is added to the reaction. After 14 hours, the weight gain of the reaction mixture is slightly above the value required for introduction of two atoms of chlorine into the molecule.

The solvent is stripped from the product at 15 mm. absolute pressure until the pot temperature reaches 75° C. The residue (84.2 parts) is distilled through a Widmer column. Dichloromethyl 3-cyano-3,3-dichloropropionate (57 parts) is obtained as a colorless oil, B.P. 104.5°–106.5° C./4.5 mm. Hg, $n_D^{25}$=1.4822–1.4834. The product has a chlorine and nitrogen content close to that required by theory. The product contains 55.9–57.6% chlorine (56.5% theoretical) and 5.6–5.7% nitrogen (5.6% theoretical).

Example 2

Dichloromethyl 3-cyano-3,3-dichloropropionate (60 parts), prepared according to Example 1, is dissolved in carbon tetrachloride (180 parts). The solution is heated to reflux temperature and chlorine gas is passed into the solution. A 300 watt spotlight placed 8 inches from the reaction vessel is used as a source of actinic light. During the chlorination, a total of four parts of $\alpha,\alpha'$-azodiisobutyronitrile is introduced in portions of 0.5 part. After a 37 hour chlorination period, the weight gain is 14.5 parts. The solvent is stripped from the product at 20 mm. absolute pressure until the pot temperature reaches 100° C. The residue (78.5 parts) is distilled through a Vigreux column to give 62 parts of a colorless oil, B.P. 103°–117° C./4.5 mm. Hg, $n_D^{25}$=1.4838–1.4915. The product contains 61–63% chlorine (required for trichloromethyl 3-cyano-3,3-dichloropropionate: 62.2%).

Using the same procedure, but substituting chloromethyl 3-cyano-3,3-dichloropropionate for the dichloromethyl ester, chlorination may be carried out until a gain in weight has been reached corresponding to the substitution of two additional atoms of chlorine. The product, upon distillation, has substantially the same properties as recorded above. Both of these products react with excess aniline to give symmetrical diphenylurea, a behavior characteristic of trichloromethyl esters.

We claim:
1. As a composition of matter, the compound having the formula

$$CNCCl_2CH_2COOCH_xCl_y$$

in which $x$ is a number of zero to one, $y$ is two to three, and $x$ and $y$ equal three.

2. As a composition of matter, dichloromethyl 3-cyano-3,3-dichloropropionate.

3. As a composition of matter, trichloromethyl 3-cyano-3,3-dichloropropionate.

4. A method for the preparation of a compound having the formula $$CNCCl_2CH_2COOCH_xCl_y$$

in which $x$ is a number of zero to one, $y$ is two to three, and $x$ and $y$ equal three, which comprises chlorinating a member from the group consisting of methyl 3-cyano-3,3-dichloropropionate and chloromethyl 3-cyano-3,3-dichloropropionate in the presence of actinic light and in a temperature range of about 20° to 100° C.

5. A method according to claim 4 in which there is present a volatile non-polar organic non-chlorinatable solvent.

6. A method according to claim 5 which is conducted in the presence of a catalytic amount of a free radical catalyst.

7. A method according to claim 4 which is conducted in a temperature range of about 50° to 95° C. in the presence of about 0.1 to 5.0% of a free radical catalyst and a volatile nonpolar organic non-chlorinatable solvent.

References Cited in the file of this patent
FOREIGN PATENTS 962,071    Germany _____ Apr. 18, 1957